(12) United States Patent
Maeker et al.

(10) Patent No.: US 11,319,473 B2
(45) Date of Patent: May 3, 2022

(54) ENVIRONMENTALLY FRIENDLY ESTER-STRUCTURES AS VISCOSIFIER FOR OIL BASED DRILLING FLUIDS

(71) Applicant: Emery Oleochemicals GmbH, Duesseldorf (DE)

(72) Inventors: Diana Maeker, Mettmann (DE); Patrick Haehnel, Duisburg (DE)

(73) Assignee: Emery Oleochemicals GmbH, Duesseldorf (DE)

( * ) Notice: Subject to any disclaimer, the term of this patent is extended or adjusted under 35 U.S.C. 154(b) by 0 days.

(21) Appl. No.: 16/345,766

(22) PCT Filed: Jul. 13, 2018

(86) PCT No.: PCT/EP2018/069171
§ 371 (c)(1),
(2) Date: Apr. 29, 2019

(87) PCT Pub. No.: WO2020/011378
PCT Pub. Date: Jan. 16, 2020

(65) Prior Publication Data
US 2021/0403787 A1    Dec. 30, 2021

(51) Int. Cl.
*C09K 8/035* (2006.01)
*C09K 8/36* (2006.01)

(52) U.S. Cl.
CPC ............... *C09K 8/035* (2013.01); *C09K 8/36* (2013.01)

(58) Field of Classification Search
CPC ........................................... C09K 8/035
See application file for complete search history.

(56) References Cited

U.S. PATENT DOCUMENTS

| | | |
|---|---|---|
| 7,959,743 B2 | 6/2011 | Mueller et al. |
| 8,148,305 B2 | 4/2012 | Westfechtel et al. |
| 8,153,562 B2 | 4/2012 | Muller et al. |
| 8,193,125 B2 | 6/2012 | Muller et al. |
| 8,236,735 B2 | 8/2012 | Maker et al. |
| 8,763,724 B2 | 7/2014 | Mueller et al. |
| 9,085,524 B2 | 7/2015 | Muller et al. |
| 9,745,502 B2 | 8/2017 | Muller et al. |
| 9,896,613 B2 | 2/2018 | Müller et al. |
| 9,982,182 B2 | 5/2018 | Muller et al. |
| 10,227,545 B2 | 3/2019 | Mäker et al. |
| 2010/0258307 A1 | 10/2010 | Muller et al. |
| 2011/0011645 A1 | 1/2011 | Muller et al. |
| 2014/0336086 A1 | 11/2014 | Frenkel |
| 2015/0376490 A1* | 12/2015 | Dino ................ C09K 8/34 507/117 |
| 2016/0230069 A1 | 8/2016 | Maker et al. |
| 2017/0335164 A1 | 11/2017 | Maker et al. |

FOREIGN PATENT DOCUMENTS

| | | |
|---|---|---|
| WO | 2008/006065 A1 | 1/2008 |
| WO | 2014/001192 A1 | 1/2014 |
| WO | 2015/062656 A1 | 5/2015 |

OTHER PUBLICATIONS

International Search Report dated Feb. 15, 2019 in PCT/EP2018/069171 (5 pages).
Maeker et al., U.S. Appl. No. 16/097,846, filed Oct. 31, 2018.
Written Opinion dated Feb. 15, 2019 in PCT/EP2018/069171 (6 pages).

* cited by examiner

*Primary Examiner* — Aiqun Li
(74) *Attorney, Agent, or Firm* — Taylor English Duma LLP; Philip P. McCann

(57) ABSTRACT

The present invention relates to a mixture of esters obtainable by reacting components of an esterifiable composition with each other, wherein the esterifiable composition comprises at least one trimer fatty acid, at least one fatty acid and at least one hydroxy monocarboxylic acid and a production process of the mixture of esters. Furthermore, the present invention relates to environmental friendly, preferably oil based, drilling fluids comprising the above-mentioned mixture of esters, water and an organic phase and the use of said mixture as viscosifier for drilling fluids.

20 Claims, No Drawings

ENVIRONMENTALLY FRIENDLY ESTER-STRUCTURES AS VISCOSIFIER FOR OIL BASED DRILLING FLUIDS

CROSS REFERENCE TO RELATED APPLICATIONS

This application is a 35 U.S.C. § 371 U.S. national phase entry of International Application No. PCT/EP2018/069171 having an international filing date of Jul. 13, 2018, which is incorporated herein by reference in its entirety.

FIELD

The present invention relates to a mixture of esters obtainable by reacting components of an esterifiable composition with each other, wherein the esterifiable composition comprises at least one trimer fatty acid, at least one fatty acid and at least one hydroxy monocarboxylic acid and a production process of the mixture of esters. Furthermore, the present invention relates to environmental friendly, preferably oil based, drilling fluids comprising the above-mentioned mixture of esters, water and an organic phase and the use of said mixture as viscosifier for drilling fluids.

BACKGROUND

The present invention relates to novel, preferably oil based, drilling fluids comprising improved additives. Particularly desirable are drilling fluids having an improved biodegradability since a significant part of these fluids generally comes into contact with the environment.

The terms "drilling fluid" or "oil based drilling fluid" used herein includes, but is not limited to fluids used in the drilling of bore holes in rock to lubricate and cool drill bits, and to transport rock cuttings away from the rock face. Drilling fluids are used in the construction of deep wells and bore holes, and especially oil and gas wells. During the drilling of oil and gas wells, drilling fluid is typically circulated in the well bore to cool and lubricate the drill bit and pipe, to carry cuttings from the bottom of the well bore to the surface, and to impose a hydrostatic head on the drilled formation to prevent the escape of oil, gas, or water from the well bore.

For various applications it is desirable to be able to adjust the viscosity of oil based drilling fluids. For this purpose viscosifier additives can be included.

It is important that the additives used in drilling fluids are ideally non-toxic or have only a low toxicity since as mentioned the drilling fluids will be contact with the environment. For offshore drilling operations it is particularly advantageous if the drilling fluids and additives therefore exhibit particularly low levels of toxicity towards marine microbial life forms also since these microorganisms enter into the food chain of larger life forms and are critical to maintain a stable ecosystem.

Thus, in particular for demanding applications there is a continued need for more effective oil based drilling fluids and additives therefore, which are at the same time characterized by a an improved biodegradability and low toxicity.

It was therefore an object of the invention to provide novel oil based drilling fluids and additives therefore which meet this demand.

SUMMARY

To solve e.g. the aforementioned problems, the present invention provides novel esters which are obtained by reacting components of an esterifiable composition with each other, wherein the esterifiable composition comprises at least one trimer fatty acid, at least one hydroxyl carboxylic acid and at least one fatty acid, wherein said mixture of esters are useful as additives for drilling fluids and drilling fluids comprising said esters. The esters of the invention have been shown to show good performance as viscosifier for oil based drilling fluids. In addition, surprisingly, the esters of the invention show better biocompatibility since the product is effectively biodegradable.

In particular the invention provides a mixture of esters obtainable or obtained by reacting components of an esterifiable composition with each other, wherein the esterifiable composition comprises
  (a) at least one trimer fatty acid,
  (b) at least one fatty acid, and
  (c) at least one hydroxy monocarboxylic acid.

A further aspect of the invention relates to a, preferably oil based, drilling fluid comprising
  (i) a mixture of esters obtainable or obtained by reacting components of an esterifiable composition with each other, wherein the esterifiable composition comprises
    (a) at least one trimer fatty acid,
    (b) at least one fatty acid and
    (c) at least one hydroxy monocarboxylic acid;
  (ii) an organic phase and
  (iii) a water phase.

A further aspect of the invention relates to a process for producing a mixture of esters, wherein the process comprises the following steps:
  a) providing at least one trimer fatty acid, at least one fatty acid and at least one hydroxy monocarboxylic acid,
  b) mixing the at least one trimer fatty acid, the at least one fatty acid and the at least one hydroxy monocarboxylic acid as to conduct an esterification, and
  c) obtaining a mixture of esters.

A further aspect of the invention relates to a use of a mixture of esters obtainable or obtained by reacting
  (a) at least one trimer fatty acid,
  (b) at least one fatty acid, and
  (c) at least one hydroxy monocarboxylic acid,
as viscosifier for oilfield treatment applications, preferably for/in oil based drilling fluids.

DESCRIPTION

Before the present invention is described in detail below, it is to be understood that this invention is not limited to the particular methodology, protocols and reagents described herein as these may vary. It is also to be understood that the terminology used herein is for the purpose of describing particular embodiments only, and is not intended to limit the scope of the present invention which will be limited only by the appended claims. Unless defined otherwise, all technical and scientific terms used herein have the same meanings as commonly understood by one of ordinary skill in the art.

In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

In the following definitions of some chemical terms are provided. These terms will in each instance of its use in the remainder of the specification have the respectively defined meaning and preferred meanings.

The term "esterifiable composition" refers to a composition comprising, preferably consisting of components comprising at least one carboxylic acid group (—COOH) or at least one hydroxyl group (—OH) or both. Preferably, the esterifiable composition comprises, preferably consists of (i) at least one fatty acid, (ii) at least one trimerized and/or dimerized fatty acid, and (ii) at least one hydroxy monocarboxylic acid, preferably at least one hydroxy fatty acid.

As used herein "dimer acid", or "dimerized fatty acid" or "dimer fatty acid" refers to dicarboxylic acids prepared by dimerizing unsaturated fatty acids. The fatty acids that are dimerized may thereby have the same number of carbon atoms or different number of carbon atoms. Preferably, unsaturated fatty acids obtained from tall oil are dimerized. A preferred dimer fatty acid useful for the invention, e.g. useful to prepare the inventive ester, is a dimer of C6-C22 monocarboxylic acids, preferably of C16-C18 monocarboxylic acids.

As used herein "trimer acid", or "trimerized fatty acid" or "trimer fatty acid" refers to tricarboxylic acids prepared by trimerizing unsaturated fatty acids. The fatty acids that are trimerized may thereby have the same number of carbon atoms or different number of carbon atoms. Preferably, unsaturated fatty acids obtained from tall oil are trimerized. A preferred trimer fatty acid useful for the invention, e.g. useful to prepare the inventive ester, is a trimer of C6-C22 monocarboxylic acids, preferably of C 16-C 18 monocarboxylic acids.

The term "alkyl" refers to a saturated straight or branched carbon chain. Preferably, an alkyl as used herein is a C1-C20 alkyl and more preferably is a C1-C10 alkyl, i.e. having 1, 2, 3, 4, 5, 6, 7, 8, 9 or 10 carbon atoms, e.g. is selected from methyl, ethyl, propyl, iso-propyl, butyl, isobutyl, tert-butyl, pentyl or hexyl, heptyl, octyl, nonyl and decyl. Alkyl groups are optionally substituted.

The term "optionally substituted" in each instance if not further specified refers to between 1 and 10 substituents, e.g. 1, 2, 3, 4, 5, 6, 7, 8, 9, or 10 substituents which are in each instance independently selected from the group consisting of halogen, in particular F, Cl, Br or I; —$NO_2$, —CN—OR'—NR'R", —(CO)OR'—(CO)OR'"—(CO)NR'R"—NR-'COR""—NR'COR', —NR"CONR'R", —NR"$SO_2$A, —COR'"; —$SO_2$NR'R", —OOCR'", —CR'"R""OH, —R'"OH, and -E;

R' and R" is each independently selected from the group consisting of hydrogen, alkyl, alkenyl, alkynyl, —OE, cycloalkyl, heterocycloalkyl, aryl, heteroaryl, and aralkyl or together form a heteroaryl, or heterocycloalkyl; optionally substituted;

R'" and R"" is each independently selected from the group consisting of alkyl, alkenyl, alkynyl, cycloalkyl, heterocycloalkyl, alkoxy, aryl, aralkyl, heteroaryl, and —NR'R";

E is selected from the group consisting of alkyl, alkenyl, cycloalkyl, alkoxy, alkoxyalkyl, heterocycloalkyl, an alicyclic system, aryl and heteroaryl; optionally substituted;

If two or more radicals can be selected independently from each other, then the term "independently" means that the radicals may be the same or may be different.

As used herein the term "about" in the context of a numerical value preferably means a deviation of +/−5% of said value.

The present invention provides novel additives for, preferably oil based, drilling fluids. It was unexpectedly found that the additives have good viscosifying-properties and are unexpectedly also improved biodegradable than generic additives.

Thus, in a first aspect of the present invention a mixture of esters is provided, which are obtainable or obtained by reacting components of an esterficable composition with each other, wherein the esterficable composition comprises
(a) at least one trimer fatty acid,
(b) at least one fatty acid, and
(c) at least one hydroxy monocarboxylic acid.

In the mixture of esters the esters comprising the at least one trimer fatty acid as one component preferably comprises at least two free carboxylic acid group and most preferably comprises exactly three free carboxylic acid groups on an average.

The mixture of esters can be obtained utilizing conventional esterification procedures. This generally involves reacting the at least one trimer fatty acid, the at least one hydroxy monocarboxylic acid and the at least one fatty acid at an elevated temperature while removing water. The reaction may be carried out by refluxing the reactants in an azeotroping solvent, such as toluene or xylene, to facilitate removal of water. Preferably, however, the reaction is carried out in the absence of solvents. Esterification catalysts may be used but are not necessary for the reaction. At the completion of the reaction the excess acid, if desired, and (if present) any solvent can be separated from the ester by vacuum stripping or distillation. The ester product thus produced may be utilized as such or it may be alkali refined or otherwise treated to reduce the acid number, remove catalyst residue, reduce the ash content, etc.

In the esterification reaction of the three different components (a) to (c), the at least one trimer fatty acid (a) preferably reacts with the at least one hydroxy monocarboxylic acid (c), and/or the at least one fatty acid (b) preferably reacts with the at least one hydroxy monocarboxylic acid (c) and/or the at least one hydroxy monocarboxylic acid (c) preferably reacts with another at least one hydroxy monocarboxylic acid (c).

Preferably, the components of the esterifiable composition, which are (a) the at least one trimer fatty acid, (b) the at least one fatty acid, and (c) the at least one hydroxy monocarboxylic acid, are present in the esterifiable composition in an amount of at least 50% by weight, preferably at least 70% by weight, preferably at least 90% by weight (based on the total weight of the esterifiable composition).

Preferably, the mixture of esters is obtainable or obtained by reacting components of an esterifiable composition with each other, wherein the esterifiable composition comprises
(a) at least one, preferably exactly one trimer fatty acid,
(b) at least one, preferably at least two, preferably at least three, preferably at least four different fatty acid(s), and
(c) at least one, preferably exactly one hydroxy monocarboxylic acid.

Preferably, the mixture of esters is obtainable or obtained by reacting components of an esterifiable composition with each other, wherein the esterifiable composition comprises
(a) at least one trimer fatty acid,
(b) at least one fatty acid,
(c) at least one hydroxy monocarboxylic acid, and
(d) at least one dimer fatty acid.

Preferably, the ratio of the at least one trimer fatty acid (a) and the at least one dimer fatty acid (d) is at least 2:1, preferably at least 3:1 ((a): (d)). Preferably, the at least one dimer fatty acid (d) is present in an amount of at most 30% by weight, preferably at most 25% by weight in the esterficable composition (based on the total amount of the at least one trimer fatty acid and the at least one dimer fatty acid present in the esterficable composition).

In a preferred embodiment of the present invention the at least one trimer fatty acid (a) is a trimer fatty acid which comprises linear, cyclic and aromatic structures. In a further preferred embodiment, said trimer fatty acid (a) is a branched or unbranched, saturated or unsaturated trimer fatty acid.

In a preferred embodiment of the present invention a mixture of esters according to the present invention or according to a preferred embodiment of the present invention is provided, wherein the at least one trimer fatty acid is a C 54 trimer fatty acid. In a particularly preferred embodiment, said trimer fatty acid (a) is a trimer fatty acid having the following general structure:

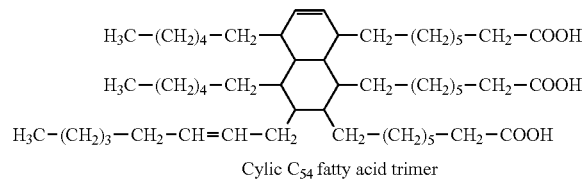

Cylic C$_{54}$ fatty acid trimer

In a preferred embodiment of the present invention a mixture of esters according to the present invention or according to a preferred embodiment of the present invention is provided, wherein the esterifiable composition comprises at least two fatty acids (b), wherein at least one of the at least two fatty acids (b) is an unsaturated fatty acid.

One of the esters, preferably in the drilling fluid according to the invention, is preferably based on the at least one fatty acid (b). Preferably, the at least one fatty acid (b) has the general formula R—COOH (I) in which R stands for a saturated or unsaturated, branched or linear alkyl- or alkenyl radical with 7 to 21 C atoms.

The fatty acids of type (b), preferably with formula (I), are in particular considered as fatty acid component (c) of the esters according to the invention. Mentioned as being preferred here are caproic acid, caprylic acid, 2-ethylhexanoic acid, capric acid, lauric acid, isotridecanoic acid, myristic acid, palmitic acid, palmoleic acid, stearic acid, isostearic acid, oleic acid, elaidic acid, petroselic acid, linoleic acid, linolenic acid, elaeostearic acid, arachic acid, gadoleic acid, behenic acid and erucic acid and mixtures thereof, which occur, e.g., for technical reasons during high-pressure cracking of natural fats and oils, or during reduction of aldehydes from Roelen's oxosynthesis.

Technical-grade fatty acids with 12 to 18 carbon atoms are preferred, such as, for example, tall oil-, coconut-, palm-, palm kernel- or tallow fatty acids.

In a preferred embodiment of the present invention a mixture of esters according to the present invention or according to a preferred embodiment of the present invention is provided, wherein the unsaturated fatty acid is a monounsaturated or polyunsaturated C12 to C24 fatty acid.

Preferably, the esterifiable composition comprises a mixture of different C12 to C18 fatty acids, which are saturated and/or unsaturated. Said mixture of different C12 to C18 fatty acids comprises at least 50% by weight, preferably at least 70% by weight, preferably at least 90% by weight unsaturated fatty acids (based on the total weight of C12 to C18 fatty acids). Preferably, the oleic acid is present in the said mixture in an amount of at least 50% by weight, preferably 65 to 75% by weight (based on the total weight of C12 to C18 fatty acids).

By using an unsaturated fatty acid, preferably oleic acid, preferably in combination with an unsaturated hydroxy fatty acid, preferably ricinoleic acid, the mixture of ester is liquid at 25° C. (and at 1013 mbar).

In a preferred embodiment of the present invention a mixture of esters according to the present invention or according to a preferred embodiment of the present invention is provided, wherein the unsaturated fatty acid is oleic acid (C18, cis-9).

In a preferred embodiment of the present invention a mixture of esters according to the present invention or according to a preferred embodiment of the present invention is provided, wherein the at least one hydroxy monocarboxylic acid (c) is a C12 to C24 hydroxy monocarboxylic acid.

One of the ester, preferably in the drilling fluid according to the invention, is preferably based on the at least one hydroxy monocarboxylic acid (b). Preferably, the at least one hydroxy monocarboxylic acid (b) is a C 12 to C36 hydroxy monocarboxylic acid.

In a further preferred embodiment, said hydroxy monocarboxylic acid (c) is a branched, unbranched, saturated or unsaturated hydroxy monocarboxylic acid.

More preferably, the unsaturated hydroxy monocarboxylic acid (c) is selected from the group consisting of a hydroxy omega-3 fatty acid, a hydroxy omega-6 fatty acid, a hydroxy omega-7 fatty acid and a hydroxy omega-9 fatty acid.

Preferably, the at least one hydroxy monocarboxylic acid (c) is a hydroxy omega-9 fatty acid, wherein said hydroxy omega-9 fatty acid is preferably selected from the group consisting of hydroxy-oleic acid, hydroxy elaidic acid, hydroxy gondoic acid, hydroxy mead acid, hydroxy erucic acid, hydroxy nervonic acid and any mixture thereof.

In a preferred embodiment of the present invention a mixture of esters according to the present invention or according to a preferred embodiment of the present invention is provided, wherein the least one hydroxy monocarboxylic acid (c) is a branched, unbranched, saturated or unsaturated hydroxy monocarboxylic acid. Preferably, the least one hydroxy monocarboxylic acid is an unsaturated hydroxy monocarboxylic acid.

Preferably, said hydroxy monocarboxylic acid (b) is an aliphatic monohydroxy monocarboxylic acid. Preferably, said hydroxy monocarboxylic acid (b) is a hydroxyl fatty acid.

In a preferred embodiment of the present invention a mixture of esters according to the present invention or according to a preferred embodiment of the present invention is provided, wherein the least one hydroxy monocarboxylic acid (c) is ricinoleic acid or hydroxy stearic acid.

In a preferred embodiment of the present invention a mixture of esters according to the present invention or according to a preferred embodiment of the present invention is provided, wherein in the esterficable composition the molar ratio of (a) the at least one trimer fatty acid, (b) the at least one fatty acid and (c) the at least one hydroxy monocarboxylic acid is from 1:1:1 to 1:5:5, preferably 1:2.5:1.5 to 1:3.5:2.5, preferably about 1:2:3 (components a:b:c).

Preferably, the at least one fatty acid is present in the esterifiable composition in higher molar amount than the at least one trimer fatty acid.

Preferably, the at least one hydroxy monocarboxylic acid is present in the esterifiable composition in higher molar amount than the at least one trimer fatty acid.

Preferably, the at least one trimer fatty acid is present in the esterifiable composition in higher molar amount than the at least one dimer acid.

In a preferred embodiment of the present invention a mixture of esters according to the present invention or according to a preferred embodiment of the present invention is provided, wherein the components of the esterifiable composition are reacted with each other at a temperature of 150° C. to 250° C. and a pressure of at least 5 mbar and under a protective gas atmosphere.

Preferably, the temperature of the esterfication is between 170 to 220° C. Preferably, the pressure during the esterification is between 0.8 to 1.2 bar, preferably about 1013 mbar.

Preferably, the protective gas of the protective gas atmosphere comprises or essentially consists of nitrogen, argon or a mixture thereof.

Preferably, the mixture of esters is obtainable or obtained by reacting components of an esterifiable composition with each other, wherein the esterifiable composition comprises
 (a) at least one trimer fatty acid,
 (b) at least two fatty acids,
 (c) at least one hydroxy monocarboxylic acid, and
 (d) at least one dimer fatty acid,
wherein the at least one trimer fatty acid is a trimer C54 trimer fatty acid, one of the at least two fatty acids is oleic acid, the at least one hydroxy monocarboxylic acid ricinoliec acid or hydroxyl stearic acid or a mixture thereof and the at least one dimer fatty acid is a C36 dimer fatty acid.

Preferably, the components of the composition, which are (a) the at least one trimer fatty acid, (b) the at least one fatty acid, (c) the at least one hydroxy monocarboxylic acid and (d) the at least one dimer acid, are present in the esterifiable composition in an amount of at least 50%, preferably at least 70% by weight, preferably at least 90% by weight, preferably at least 95% by weight (based on the total weight of the esterifiable composition).

In a second aspect of the present invention a drilling fluid, preferably an oil based, drilling fluid, is provided, which comprises
 (i) a mixture of esters, preferably according to present invention or according to a preferred embodiment of the present invention, obtainable or obtained by reacting components of an esterifiable composition with each other, wherein the esterifiable composition comprises
  (a) at least one trimer fatty acid,
  (b) at least one fatty acid and
  (c) at least one hydroxy monocarboxylic acid;
 (ii) an organic phase and
 (iii) a water phase.

Preferably, the drilling fluid of the present invention is a water-in-oil emulsion comprising water and an organic phase. Preferably, the drilling fluid of the present invention is an oil-based drilling fluid and therefore a water-in-oil emulsion which comprises in total more organic phase than water. Preferably, the volume ratio between the organic phase and the water in the drilling fluid of the invention is between 50:50 to 95:05.

In a preferred embodiment of the present invention a drilling fluid according to the present invention or according to a preferred embodiment of the present invention is provided, which further comprises at least one additive.

In a preferred embodiment of the present invention a drilling fluid according to the present invention or according to a preferred embodiment of the present invention is provided, wherein the at least one additive is selected from the group consisting of a thickener, a viscosifier, a fluid loss additive, a wetting agent, a fine-particle weighting agent, a salt, an alkali reserve, a thinner, a biocide, a dispersant, an emulsifier, a lubricant, a surfactant, a native oil, an ester and any mixture thereof, wherein the least one additive is different from the components of the mixture of esters.

It is also possible that mixture of esters in the drilling fluid, preferably oil based drilling fluid, is premixed with one or more of the above mentioned further additives.

In a preferred embodiment of the present invention a drilling fluid according to the present invention or according to a preferred embodiment of the present invention is provided, wherein the organic phase comprises one or more compound selected from the group consisting of
 (1) a carboxylic acid ester of formula: R'—COO—R" (I);
  where R' is a saturated or unsaturated, linear or branched C5 to C23 alkyl group and R" is a C1 to C22 alkyl group, which may be saturated or unsaturated, linear or branched;
 (2) a linear or branched C8 to C30 olefin;
 (3) a water-insoluble, symmetrical or nonsymmetrical ether of a monohydric alcohol and preferably of a C1 to C24 monohydric alcohol;
 (4) a water-insoluble alcohol of formula: R'''—OH (II), where R''' is a saturated, unsaturated, linear or branched C8 to C24 alkyl group;
 (5) a carbonic acid diester;
 (6) a paraffin;
 (7) a mineral oil;
 (8) an α-olefin, an internal olefin, a poly-α-olefin, or combinations thereof; and
 (9) diesel fuel.

Preferably said organic phase of the drilling fluid of the invention has a viscosity of <50 mP·s at 40° C. A suitable organic phase that can be used in the drilling fluid of the present invention may also be a crude or refined hydrocarbon or mineral oil conventionally used in the drilling arts, for example crude oil, gas oil, and the like. Other oils including turpentine, cotton seed oil, whale oil, tall oil, tall oil esters, linseed oil, and other animal or vegetable oils can be utilized as organic phase as well. A suitable vegetable oil is for example tall oil ester. The organic phase is preferably present in the drilling fluid of the invention in the range of about 10 to 95 percent by volume of the drilling fluid, preferably 50 to 95 and more preferably in the range of about 75 to 95 percent by volume of the drilling fluid.

As water mentioned in (iii) of the drilling fluid of the present invention any water can be used. This water can for example be distilled water, non-purified sweet water, sea water, tap water or brine. Preferably the water is present as a saturated calcium brine having a calcium chloride content of 250,000 to 350,000 ppm, although other brine solutions can be used. Water which can be present in the drilling fluid of the invention is preferably present in the range from 30 about 5 to as high as about 50 percent by volume of drilling fluid. More preferably the water content in the drilling fluid is about 5 to 25 volume percent based on the total volume of the drilling fluid with the most preferred range being about 5 to 20 volume percent.

In a preferred embodiment of the present invention a drilling fluid according to the present invention or according to a preferred embodiment of the present invention is provided, wherein the mixture of esters has an aerobic degradability of at least 21% after 28 days in seawater according to the Marine Bodis test which is a Modified ISO 10708 test for the Marine Environment using guidance in the HOCNF guidelines (OSPAR Agreement: 2012/05. Update 2015).

One unexpected advantage of the mixture of esters according to the invention is that it has an improved biodegradation. Thus, it is preferred that said ester used in the well treatment fluid of the invention has an aerobic degradability of at least 21% after 28 days in seawater according to the Marine Bodis test which is a Modified ISO 10708 test for the Marine Environment using guidance in the HOCNF guidelines (OSPAR Agreement: 2012/05. Update 2015).

In a preferred embodiment of the present invention a drilling fluid according to the present invention or according to a preferred embodiment of the present invention is provided, wherein the mixture of esters is present in an amount of 0.01 to 5% by weight, preferably 0.01 to 1% by weight, preferably 0.2 to 1% by weight (based on the total weight of the drilling fluid).

Thus, in a third aspect of the present invention process for producing a mixture of esters according to the present invention or according to a preferred embodiment of the present invention is provided, wherein the process comprises the following steps:
  a) providing at least one trimer fatty acid, at least one fatty acid and at least one hydroxy monocarboxylic acid,
  b) mixing the at least one trimer fatty acid, the at least one fatty acid and the at least one hydroxy monocarboxylic acid as to conduct an esterfication, and
  c) obtaining a mixture of esters.

In a preferred embodiment of the present invention a process according to the present invention or according to a preferred embodiment of the present invention is provided, wherein the step of mixing is conducted at a temperature of 150° C. to 250° C. and a pressure of at least 5 mbar and under protective gas atmosphere.

Preferably, the temperature of the mixing step (step b) is between 170 to 220° C. Preferably, the pressure during the mixing step (step b) is between 0.8 to 1.2 bar. Preferably, the protective gas of the protective gas atmosphere comprises or essentially consists of nitrogen, argon or a mixture thereof.

Due to its improved biodegradability the mixture of esters of the invention is suitable for offshore well drilling operations. Thus, in a further aspect the invention provides the use of the mixture of esters as defined herein in the context of drilling fluids of the invention as viscosifier for drilling fluid and preferably for a drilling fluid for offshore well drilling.

Thus, in a fourth aspect of the present invention a use of a mixture of esters, preferably according to the present invention or according to a preferred embodiment of the present invention, which are obtainable by reacting components of an esterifiable composition with each other, wherein the esterifiable composition comprises
  (a) at least one trimer fatty acid, and
  (b) at least one fatty acid, with
  (c) at least one hydroxy monocarboxylic acid
as viscosifier for oilfield treatment applications, preferably in an oil based drilling fluid, is provided.

Various modifications and variations of the invention will be apparent to those skilled in the art without departing from the scope of the invention. Although the invention has been described in connection with specific preferred embodiments, it should be understood that the invention as claimed should not be unduly limited to such specific embodiments.

The following examples are merely illustrative of the present invention and should not be construed to limit the scope of the invention as indicated by the appended claims in any way.

EXAMPLES

Example 1: Production of Esters (i)

Esters (i) according to the invention including those shown in the table below can be prepared for example as outlined in the following:

1 mol C54 trimer fatty acid (Pripol 1040 from Croda) is mixed with 3 mol ricinoleic acid (Nouracid CZ 80 from Oleon) and 2 mol oleic fatty acid (Edenor TiO5 from KLK) and heated under a nitrogen atmosphere to 170° C. The mixture is stirred for 1.5 hours under normal pressure at a temperature of 170-220° C. A vacuum of about 300 mbar is applied at a temperature of 220° C. The mixture is stirred at a temperature of about 220° C. under a vacuum of about 300 mbar for about 1 hours. The mixture is allowed to cool to room temperature under vacuum.

Example 2: Production of a Drilling Fluid

An oil based drilling fluid was prepared as follows: the indicated amounts of the following ingredients are mixed using a Silverson Mixer (model L4RT) in the following order: synthetic paraffin, filtration control agent (a polymer: preferably Adapta by Halliburton), $Ca(OH)_2$, Amidoamin (Terradril EM 1122), Water, $CaCl_2*2H_2O$, $BaSO_4$, ball clay (=hymod prima clay).

Next, either 2.5 g esters of the invention (for example reaction product of trimer fatty acid, ricinoleic acid and oleic acid) or a conventional viscosifier (C36 dimer acid) is added to 350 mL of the mixture as listed in the table 1, below and to obtain the final emulsion a standard Hamilton Beach mixer was used, following manufacturer's instructions.

Example 3: Determining of Physical Properties of the Drilling Fluid

Next, the rheological characteristics including the fluids-plastic viscosity (PV), yield point (YP) and gel strength (gels 10"/10') after 10 seconds and 10 minutes were determined with a Fann SR 12/Model 35 rheometer (Fann). In addition to the rheological characteristics, the electrical stability was tested using a Model 23D Electrical Stability Tester, following manufacturer's instructions, in accordance with API recommended practice 13B-2, December 1991.

The drilling fluid was also tested in a Roller Oven for the indicated times at the indicated temperatures (after hot rolling=AHR and before hot rolling=BHR as indicated in the Table). As roller oven, a Baroid Laboratory Roller Oven was used, following manufacturer's instructions.

The compounds were prepared and analyzed as described. The results are summarized in the following tables:

TABLE 1

OIL BASED MUD EVALUATION

Weight: g/cm$^3$     Oil/Water ratio 70/30
10.4 b/gal     Date:

TABLE 1-continued

OIL BASED MUD EVALUATION

Salinity: 250,000 ppm  
Mix Method:

| | unit | Value |
|---|---|---|
| Synthetic paraffin | g | 146.3 |
| Filtration control agent (polymer) | g | 1-4 |
| Ca(OH)$_2$ | g | 4-7 |
| Amidoamin (Terradril EM 1122) | g | 8-10 |
| Water | | 77 |
| CaCl$_2$·$_{2H2O}$ | | 40 |
| BaSO4 | | 156 |
| Ball clay | | 15-30 |
| Dimer fatty acid C36 (Emery 2003) | g | — 2.5 — |
| Reaction product of Trimer fatty acid/Ricinolic acid/Oleic acid | g | — — 2.5 |

| | | System 1: Blindwert | | System 2: Dimer C36 | | System 3: Reaction product of Trimer fatty acid/Ricinolic acid/Oleic acid | |
|---|---|---|---|---|---|---|---|
| | | BHR | AHR | BHR | AHR | BHR | AHR |
| Hours rolled/aged | h | | 16 | | 16 | | 16 |
| Hot roll temp. | °F. | | 150 | | 150 | | 150 |
| | | \multicolumn{6}{c}{Measuring temp. 50° C.} | |
| Electrical stab. | V | 180 | 200 | 215 | 300 | 340 | 310 |
| 600 rpm | skt | 35 | 37 | 45 | 44 | 41 | 42 |
| 300 rpm | | 20 | 20 | 26 | 27 | 25 | 25 |
| 200 rpm | | 15 | 14 | 20 | 22 | 19 | 20 |
| 100 rpm | | 9 | 8 | 15 | 15 | 14 | 13 |
| 6 rpm | | 2 | 3 | 5 | 6 | 6 | 7 |
| 3 rpm | | 1 | 2 | 5 | 5 | 5 | 5 |
| PV | cP | 15 | 17 | 19 | 17 | 16 | 17 |
| YP | lb/100 ft$^2$ | 5 | 3 | 7 | 10 | 9 | 8 |
| Gels 10"/10' | lb/100 ft$^2$ | 3/7 | 3/3 | 6/7 | 7/8 | 6/8 | 9/14 |

Example 4: Testing Biological Degradability

The biodegradation rate was measured using the "Marine BODIS" test which is a "Modified ISO 10708 test for the Marine Environment using guidance in the HOCNF guidelines (OSPAR Agreement: 2012/05)" with a contact time of 28 days and a temperature of 20° C.+/−1° C.

This method uses natural seawater (salinity 32‰-34‰) with added mineral nutrients (8.5 g/l KH$_2$PO$_4$, 21.75 g/l K$_2$HPO$_4$, 33.4 g/l Na$_2$HPO$_4$.2H$_2$O, 0.5 g/l NH$_4$Cl, 0.25 g/l FeCl$_3$.6H$_2$O, 0.4 g/l EDTA) and no inoculum was added in addition to the microorganisms already present in the seawater. The test vessels were closed glass bottles with a known volume of aqueous test mixture (66.6%) and air (33.3%). They were shaken continuously to assure steady state oxygen partitioning between the aqueous and gaseous phase. The degradation was followed by weekly measurements of the biochemical oxygen demand (BOD) in the aqueous phase for a 28-day period. The test vessels were re-aerated and resealed after measurement. The total oxygen uptake in the test flasks was calculated from the measured oxygen concentration divided by the saturation value at normal conditions and multiplied with the total oxygen content originally present in the aqueous and gaseous phases.

Three replicates were used for each test condition: test material, oxygen blank, reference, control and reference base oil (RBO). The total oxygen capacity of each test vessel was 26.93-27.22 mg oxygen. Sodium benzoate was used as the soluble reference substance (which is readily degradable) at a concentration of 40 mg/L of theoretical oxygen demand (Th OD) per test vessel.

One gram/bottle of silica powder containing 3.66 mg of ThOD/g of test material or reference base oil was used for each test vessel. The ThOD for the test substance was 2.9 mg oxygen/mg and the addition rate was 1.256 mg/bottle.

The following controls were included: Background oxygen consumption in test medium with clean silica powder.

Validity criteria stated: The insoluble reference base oil achieve 35-70% biodegradation in 28 days.

The test results for the compounds of the invention were as follows:

The oxygen blank and reference oil degradation were within formal and informal limits of acceptability respectively. The soluble reference material, sodium benzoate, degraded by more than 50% in the first 7 days, and by more than 60% in the first 14 days (Table 4.8), indicating that the seawater used in the test contained a satisfactory population of viable bacteria. The seawater data presented in Table 4.10 confirms the microbial count for seawater used in this test was within acceptable limits.

The mixture of esters of the present invention achieved a maximum biodegradation of 23% on day 21 of the 28 day study. The mixture of esters of the present invention biodegraded by 22% over 28 days and showed an inhibition of −4% to seawater bacteria.

C36 dimer acid biodegraded by 12% over 28 days and showed an inhibition of −1% to seawater bacteria. The test was extended for an additional 42 days to establish whether degradation was continuous after the test period. C36 Dimer acid achieved a maximum biodegradation of 22% during the 70 day study.

The Marine BOD IS guideline states that if in the toxicity test, the degradation of test material plus reference is less than 25% (based on ThOD) in 7 days, the test material can be assumed to be inhibitory to bacteria. The percentage degradation of test material plus reference on day 7 is 59%, therefore it is concluded that the mixture of esters of the present invention is not inhibitory and the test was not required to be repeated for inhibitory reasons.

According to the above outlined results the mixture of esters of the present invention unexpectedly showed no significant disadvantages in toxicity and an improved biodegradability.

The invention claimed is:

1. A mixture of esters produced by reacting components of an esterifiable composition with each other, wherein the esterifiable composition comprises
   (a) at least one trimer fatty acid,
   (b) at least one fatty acid, and
   (c) at least one hydroxy monocarboxylic acid.

2. The mixture of esters according to claim 1, wherein the at least one trimer fatty acid is a C 54 trimer fatty acid.

3. The mixture of esters according to claim 1, wherein the esterifiable composition comprises at least two fatty acids (b), wherein at least one of the at least two fatty acids is an unsaturated fatty acid.

4. The mixture of esters according to claim 3, wherein the unsaturated fatty acid is a monounsaturated or polyunsaturated C12 to C24 fatty acid.

5. The mixture of esters according to claim 3, wherein the unsaturated fatty acid is oleic acid (C18, cis-9).

6. The mixture of esters according to claim 1, wherein the at least one hydroxy monocarboxylic acid (c) is a C12 to C24 hydroxy monocarboxylic acid.

7. The mixture of esters according to claim 1, wherein the at least one hydroxy monocarboxylic acid (c) is a branched, unbranched, saturated or unsaturated hydroxy monocarboxylic acid.

8. The mixture of esters according to claim 1, wherein the least one hydroxy monocarboxylic acid (c) is ricinoleic acid or hydroxy stearic acid.

9. The mixture of esters according to claim 1, wherein the molar ratio of (a) the at least one trimer fatty acid, (b) the at least one fatty acid and (c) the at least one hydroxy monocarboxylic acid is from 1:1:1 to 1:5:5.

10. The mixture of esters according to claim 1, wherein the components of the esterifiable composition are reacted with each other at a temperature of 150° C. to 250° C. and a pressure of at least 5mbar and under a protective gas atmosphere.

11. A drilling fluid comprising
   i) a mixture of esters produced by reacting components of an esterifiable composition with each other, wherein the esterifiable composition comprises
      (a) at least one trimer fatty acid,
      (b) at least one fatty acid and
      (c) at least one hydroxy monocarboxylic acid;
   (ii) an organic phase and
   (iii) a water phase.

12. The drilling fluid according to claim 11, which further comprises at least one additive.

13. The drilling fluid according to claim 12, wherein the at least one additive is selected from the group consisting of a thickener, a further viscosifier, a fluid loss additive, a wetting agent, a fine-particle weighting agent, a salt, an alkali reserve, a thinner, a biocide, a dispersant, an emulsifier, a lubricant, a surfactant, a native oil, an ester and any mixture thereof, wherein the least one additive is different from the components of the mixture of esters.

14. The drilling fluid according to claim 11, wherein the organic phase comprises one or more compound(s) selected from the group consisting of
   (1) a carboxylic acid ester of formula: R'—COO—R" (I);
      where R' is a saturated or unsaturated, linear or branched C5 to C23 alkyl group and R" is a C1 to C22 alkyl group, which may be saturated or unsaturated, linear or branched;
   (2) a linear or branched C8 to C30 olefin;
   (3) a water-insoluble, symmetrical or nonsymmetrical ether of a monohydric alcohol and preferably of a C 1 to C24 monohydric alcohol;
   (4) a water-insoluble alcohol of formula: R'''—OH (II), where R''' is a saturated, unsaturated, linear or branched C8 to C24 alkyl group;
   (5) a carbonic acid diester;
   (6) a paraffin;
   (7) a mineral oil;
   (8) an α-olefin, an internal olefin, a poly-α-olefin, or combinations thereof; and
   (9) diesel fuel.

15. The drilling fluid according to claim 11, wherein the mixture of esters has an aerobic degradability of at least 21% after 28 days in seawater according to the Marine Bodis test as defined in Modified ISO 10708 test for the Marine Environment using guidance in the HOCNF guidelines (OSPAR Agreement: 2012/05, Update 2015).

16. The drilling fluid according to claim 11, wherein the mixture of esters is present in an amount of 0.01 to 5% by weight based on the total weight of the drilling fluid.

17. A process for producing the mixture of esters according to claim 1, wherein the process comprises the following steps:
   a) providing the at least one trimer fatty acid, the at least one fatty acid and the at least one hydroxy monocarboxylic acid,
   b) mixing the at least one trimer fatty acid, the at least one fatty acid and the at least one hydroxy monocarboxylic acid as to conduct an esterfication, and
   c) obtaining the mixture of esters.

18. The process according to claim 17, wherein the step of mixing is conducted at a temperature of 150° C. to 250° C. and a pressure of at least 5mbar and under protective gas atmosphere.

19. An oilfield viscosifier comprising a mixture of esters produced by reacting components of an esterifiable composition with each other, wherein the esterifiable composition comprises
   (a) at least one trimer fatty acid,
   (b) at least one fatty acid, and
   (c) at least one hydroxy monocarboxylic acid.

20. The mixture of esters according to claim 1, wherein the molar ratio of (a) the at least one trimer fatty acid, (b) the at least one fatty acid and (c) the at least one hydroxy monocarboxylic acid is from 1:2:3.

* * * * *